United States Patent [19]

Akao

[11] Patent Number: 4,513,050

[45] Date of Patent: Apr. 23, 1985

[54] MATERIAL FOR PACKAGING LIGHT-SENSITIVE MATERIALS

[75] Inventor: Mutsuo Akao, Minami-ashigara, Japan

[73] Assignee: Fuji Photo Film Co., Ltd., Minami-ashigara, Japan

[21] Appl. No.: 487,567

[22] Filed: Apr. 22, 1983

[30] Foreign Application Priority Data

Apr. 26, 1982 [JP] Japan .................................. 57-68620

[51] Int. Cl.³ ........................ B32B 27/00; B32B 27/16
[52] U.S. Cl. .................................. 428/200; 428/201; 428/206; 428/207; 428/215; 428/347; 428/458; 428/463; 428/408; 428/516; 428/520; 428/483; 428/910; 428/913; 264/176 R; 426/126; 426/127; 206/455; 206/497
[58] Field of Search ............... 428/347, 323, 463, 328, 428/458, 408, 516, 520, 215, 200, 201, 206, 207, 483

[56] References Cited

U.S. PATENT DOCUMENTS

| | | | |
|---|---|---|---|
| 4,359,499 | 11/1982 | Akao | 428/483 |
| 4,387,126 | 6/1983 | Rebholz | 428/463 |
| 4,407,872 | 10/1983 | Horii | 428/347 |
| 4,424,256 | 1/1984 | Christensen et al. | 428/347 |

Primary Examiner—Patricia C. Ives
Attorney, Agent, or Firm—Burns, Doane, Swecker and Mathis

[57] ABSTRACT

A material for packaging light-sensitive materials composed of a composite sheet comprising a substrate coated with a middle layer(s) and a surface layer(s) is manufactured through melt co-extrusion, said surface layer(s) being of thermoplastic resins which have excellent heat seal properties yet have great neck-in, said middle layer(s) being of thermoplastic resins having small neck-in and excellent adhesion to a substrate, and any of layers of said composite sheet containing light-shielding material.

14 Claims, 15 Drawing Figures

MATERIAL FOR PACKAGING LIGHT-SENSITIVE MATERIALS

BACKGROUND

The present invention relates to a material for packaging light-sensitive materials which deteriorate on exposure to light, in particular, to a material for packaging light-sensitive materials for photographic use.

Heretofore, as the light-shielding paper for such packaging materials, for example as a backing sheet for photographic roll film, a composite sheet comprising a flexible substrate (a so-called "flexible sheet") such as paper coated with a thermoplastic resin layer has widely been used. A wide variety of resins have been used for the thermoplastic resin layer, all having both merits and demerits.

For instance, low density polyethylene (hereinafter referred to as "LDPE") when used for the thermoplastic resin layer has the following demerits: various kinds of defects due to its insufficient flexibility tends to develop; heat seal temperature is high; no heat-sealability with a polystyrene spool for photographic film is obtained; when LDPE is heat-sealed with LDPE, heat-seal defects due to dusts, powders etc. (i.e. when powdery concomitants are present, heat-sealability is decreased) often occur; addition of a light-shielding material decreases strength of film and sealing strength.

Similarly, to take the case of ethylene-vinyl acetate copolymer (hereinafter referred to as "EVA"), it has the following defects: water absorbability is too great; blocking tends to occur; carbon black is not uniformly dispersed; a substrate such as paper is not well adhered; neck-in is too great; film composed of EVA is not sharply and readily cut. Therefore, a composite sheet composed of a substrate coated with a single melt extruded EVA layer containing carbon black is not yet put to practical use as a light-shielding paper for the photographic roll film.

In case that acrylic ester copolymer such as ethylene-ethylacrylate copolymer (hereinafter referred to as "EEA") is coated through melt extrusion, there also arise problems similar to those with the EVA coating such as too great neck-in, frequently occurring blocking, uneven dispersion of carbon black, poor adhesion to a substrate (Generally, EEA is inferior to LDPE) and a high cost.

Consequently, most light-shielding paper has been manufactured by a process in which EVA is dissolved in a solvent and the resultant solution is coated to a substrate, which results in a high manufacturing cost. In case of EEA coating, the hot melt coating or the above-mentioned solution coating process has often been used for preparing a light-shielding paper for packaging powdered medicine or food such as chocolate, which leads to a high manufacturing cost. Since melt extrusion coating of EVA or EEA causes great neck-in and insufficient adhesion to a substrate, the solution coating process has been the only choice available.

SUMMARY OF THE DISCLOSURE

Accordingly, it is an object of the present invention to provide a novel and inexpensive material for packaging light-sensitive materials.

It is another object of the present invention to provide a material for packaging light-sensitive materials having excellent heat seal properties and free from the above-mentioned disadvantages of the conventional products, especially such problems as insufficient adhesion to a substrate and too great neck-in.

It is a further object of the present invention to provide a process for manufacturing a material for packaging light-sensitive materials having excellent heat seal properties and free from the above-mentioned drawbacks in the conventional products and manners.

Still further objects of the present invention will become apparent in the following disclosure.

Accordingly, the present invention provides a material for packaging light-sensitive materials composed of a composite sheet comprising a substrate coated with at least a middle layer and at least a surface layer through melt co-extrusion, said surface layer being of thermoplastic resin which has good heat seal properties yet has larger neck-in, said middle layer being of thermoplastic resin having small neck-in and good adhesion to a substrate, and one or more layers of said composite sheet containing light-shielding material.

The present invention further provides a process for manufacturing the above-mentioned material for packaging light-sensitive materials by co-extruding and laminating said surface layer(s) and said middle layer(s) onto a substrate to form said composite sheet.

Heretofore, since a single melt extrusion coating layer (surface layer, i.e., heat seal layer) has both merits and demerits, it has been impossible to remove the demerits alone from the surface layer. The present invention resolves the aforementioned problem by laminating a middle layer of a thermoplastic resin (B) having small neck-in and good adhesion to a substrate, together with a surface layer (a heat seal layer) onto a substrate through a melt co-extrusion process. In addition, the material of the present invention meets all the other requirements for the material for packaging light-sensitive materials. Requisite properties for a material for packaging light-sensitive materials are as follows: small neck-in required for manufacturing the above-mentioned laminated sheet, superb heat seal properties necessary for making envelopes or bags, good light-shielding properties, uniform dispersion of light-shielding materials, superior sealability at low temperatures, excellent sealability when powdery concomitants are present, good hot tack, superior ability of being sharply and readily cut by cutters and the like, superb anti-blocking, and good water or moisture proofness. Other requirements relating to the manufacturing cost are fast laminating speed and reduced cost for film materials which lead to a low overall manufacturing cost. As a material for packaging photographic roll film, heat seal properties with polystyrene in addition to flexibility are required when the packaging material is heat-sealed with a polystyrene spool. The material for packaging light-sensitive materials of the present invention meets all the above requirements and is of great practical use.

The material for packaging light-sensitive materials of the present invention can be used for photographic light-sensitive materials, medicines, dyes, foods and the like which change or deteriorate their characteristics on exposure to light. Especially it is most suitable for a light-shielding paper for photographic roll film.

Figure 1:
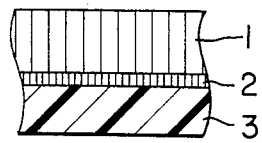
FIGS. 1 to 4 are sectional views showing examples of conventional packaging materials.

The drawings are being presented for better illustration of the embodiments and not for the limitative purpose. Modifications suitable in the art may be entered without departing from the concept of the present invention.

DETAILED DESCRIPTION OF THE PREFERRED EMBODIMENTS

The packaging material of the present invention is composed of at least three layers, i.e., a substrate, a middle layer and a surface layer. Of the layers, a substrate may be chosen from those which have been used for conventional packaging materials. Those having some flexibility, excellent light-shielding properties and high physical strengths are preferable, e.g., paper, bonded cloth, cellophane, synthetic paper, aluminum foil, thermoplastic film and the like. Thermoplastic resin film for a substrate encompasses high-density polyethylene, cross-laminated streched film made from high-density polyethylene of which the stretching axis is cross-laminated (crossing angle: 45-90 degrees), polyester, polyamide, polypropylene and the like. The substrate is not limited to one layer but may be made of lamination of several different material layers. In this case, various combinations of materials are possible in accordance with required light-shielding properties, moisture proofness, physical strengths, cost, thickness etc. In general, a combination of paper and thermoplastic resin film is used. Lamination of substrate layers can be made through melt extrusion coating of thermoplastic resins, with solvent type or solution type adhesives, or through the thermal bonding process or other known processes. A substrate may be provided with a printed layer and a protective layer on its surface(s).

Neck-in herein used refers to a phenomenon that, in case that a thermoplastic resin is extruded from a slit like die to form a film or a coating layer, the resin film shrinks due to its surface tension immediately after it has come out from the die, which results in a narrower film width than the die width. Occurrence of neck-in not only makes it impossible to produce a film of a predetermined width, but also the margin portion of the film becomes thick due to its shrinkage so that film thickness becomes uneven entailing a big trimming loss. Besides the, thickened margin portion tends to stick to the pressure roll.

Thermoplastic resins (B) having small neck-in and good adhesion to a substrate include low-density polyethylene (hereinafter referred to as "LDPE"), moderate-density polyethylene (hereinafter referred to as "MDPE"), high-density polyethylene (hereinafter referred to as "HDPE"), polypropylene; ethylene-acrylate copolymer [e.g. ethylene-alkylacrylate copolymer (EEA, EMA, etc.)], ethylene-methacrylate copolymer and ethylene-vinyl acetate copolymer (EVA), each of those three copolymers containing not less than 95 wt % of ethylene; and mixtures mainly composed of those resins.

Thermoplastic resins (A) forming a surface layer (a heat seal layer) and having good heat seal properties and larger neck-in encompass ethylene-vinyl acetate copolymer (EVA), ethylene-acrylate copolymer [e.g., ethylene-alkylacrylate copolymer (EEA, EMA, etc.)] and ethylene-methacrylate copolymer, each of those three copolymers containing not more than 93 wt % of ethylene (preferably 75-90 wt %); linear low-density polyethylene (hereinafter referred to as "L-LDPE); ionomer and the like; and a mixture of those resins.

Neck-in values for such resins measured under below-mentioned conditions are shown in Table 1. Of the resins having large neck-in values, EVA and ionomer were measured at 280° C. and L-LDPE, EEA and EMA at 310° C. Of the resins having small neck-in values, EVA containing not less than 95 wt % of ethylene was measured at 280° C., EEA, EMA, LDPE, MDPE and HDPE were measured at 310° C.

Conditions
An extruder made by Minamisenju Seisakusho Co., Ltd. of the following dimension was used.
Diameter: 65 mm$\phi$,   Screw: L/D 25
Die Width: 550 mm, and Die (Slit) Openings: 0.7 mm Measuring Conditions
Air Gap: 90 mm,   Take-up Speed: 80 m/min A surface layer (a heat seal layer) (or layers) and a middle layer (or layers) are laminated onto either one or both surfaces of a substrate through melt co-extrusion. A material composed of a substrate, surface layers and middle layers which are laminated onto both surfaces of the substrate through melt co-extrusion is useful as a light-shielding paper for some kinds of packaging of photographic roll film.

The above-mentioned thermoplastic resins (A) have excellent sealability at low temperatures, superior sealability even when powdery concomitants are present (hereinafter referred to as "good sealability with concomitants") and sufficient sealability with polystyrene (useful as a material for packaging photographic roll film) and are used for the surface layer (the heat seal layer) of the present invention. As hereinbefore mentioned, however, these resins have such drawbacks as large neck-in, easy cut-off or tear off, and insufficient sealability with a substrate (poor adhesion). Furthermore, since addition of carbon black (light-shielding material) makes such drawbacks more conspicuous, these resins have not been put to practical use as melt extrusion coating. As hereinbefore described, the surface layer (or layers) of the present invention may contain light-shielding material.

Preferable combinations of the thermoplastic resins (A) for the surface layer and the thermoplastic resins (B) for the middle layer are as follows:

| (A) | (B) |
| --- | --- |
| Ethylene-vinyl acetate Copolymer containing not more than 93 wt % of ethylene(EVA) | Low-density polyethylene or moderate/high-density polyethylene→ |
| Ethylene-acrylate copolymer (EEA) containing not more than 93 wt % of ethylene | Low-density polyethylene or moderate/high-density polyethylene |
| Linear low-density polyethylene (L-LDPE) | Low-density polyethylene or moderate/high-density polyethylene |
| Ionomer | Low-density polyethylene or moderate/high-density polyethylene |
| Ethylene-methacrylate copolymer containing not more than 93 wt % of ethylene | Low-density polyethylene or moderate/ high-density polyethylene→ |

Since such packaging materials are manufactured through the melt co-extrusion coating process, they can be produced faster and at a lower manufacturing cost than conventional ones made through the solution coating process using solutions obtained by dissolving EVA, EMA and/or EEA in solvents.

L-LDPE, as well as the other aforementioned resins, may effectively be utilized for the surface layer by employing the process of the present invention. L-LDPE is a low-density polyethylene copolymer obtainable by copolymerizing ethylene and 0.5 to 10 wt % α-olefin having 4 to 10 carbons through a low pressure process. It is commercially available in the following trade names: Unipol (U.C.C.), Dowlex (Dow Chemical Co., Ltd.), Sclair (Du-Pont de Nemour Canada), Marlex (Phillips Co., Ltd.) and Ultzex (Mitsui Petrochemical Industries Co., Ltd.). L-LDPE is excellent in hot tack, sealability with concomitants and tear strength, and in addition, it has such an advantage that the aforementioned excellent characteristics are not impaired even when a large quantity of carbon black is incorporated. By co-extruding L-LDPE with other thermoplastic resins (B) having small neck-in through the melt extrusion process, a packaging material with desirable neck-in and improved cutting readiness and unsealing properties can be obtained. Especially preferable thermoplastic resins (B) for use in combination with L-LDPE are low-density polyethylene (LDPE), moderate-density polyethylene (MDPE), high-density polyethylene (HDPE), polypropylene and the like.

It is desirable that some considerations should be taken into account when thickness of a surface layer (or layers) or a middle layer (or layers) to be co-extruded are determined.

It is preferable that the thickness of the surface layer is smaller than that of the middle layer.

Heretofore, it has been difficult to make a thin surface layer (heat seal layer) independently and stably due to neck-in. The process of melt co-extrusion of the surface layer (or-layers) and a middle layer (or layers) of the present invention permits a choice of even a smallest thickness required for the surface layer.

The required thickness of the surface layer varies according to a use or other conditions. In general, it ranges from 1 to 30 microns, preferably from 3 to 20 microns. The combined thickness of the surface layer and the co-extruded middle layer is approximately 7 to 100 microns, preferably about 10 to 50 microns.

For preventing neck-in, the surface layer is thinner than the middle layer. Preferable thickness ratio between the heat seal layer and the middle layer range from 1:1.2 to 1:25, more preferably from 1:2 to 1:15. The lower limit of thickness of each layer to be co-extruded is determined by such factors as film formation ability and neck-in of each layer, and the combined total thickness of the two layers. When the aforementioned lower limit of the combined thickness of the two kinds of layers is less than 7 microns film formation from thermoplastic resins through extrusion would be difficult, whereas when the combined thickness exceeds the upper limit, 100 microns the manufacturing cost becomes too high.

Since the material of the present invention is a material for packaging light-sensitive materials, at least one layer necessarily contains light-shielding material. The light-shielding material may be mixed into and dispersed in a substrate and/or co-extruded resin layers. It may also be adhered to surfaces of layers (usually to a surface or surfaces of a substrate) through printing, impregnation, coating or deposition. The light-shielding material used herein refers to the material which does not transmit ultraviolet and visible rays of light and is available in the form of film such as aluminum deposited film, metal foil such as aluminum foil or particulate or powdery material dispersed in the layers. Particularly, the light-shielding material encompasses inorganic and organic pigments such as carbon black, iron oxide, zinc oxide, titanium oxide, aluminum powder, aluminum paste, calcium carbonate, barium sulfate, cadmium pigments, chrome yellow pigments, red oxide, cobalt blue, copper phthalocyanine pigments, monoazo or polyazo pigments, aniline black and other various pigments and mixtures thereof.

The light-shielding material may be contained in an adhesive layer or layers in a substrate.

The substrate herein used includes one to which a light-shielding layer (or layers) in the form of film or foil is adhered. In the examples to be described hereinafter, however, the substrate is expressed separately from the light-shielding layer for the sake of convenience. Aluminum foil, in general, is used not only as a light shielding layer but is often preferred also for its antistatic properties.

The packaging material of the present invention having the aforementioned structure is not only advantageous in the manufacturing process, but is useful as an excellent material for packaging light-sensitive materials which is suitable for a wide variety of uses.

The light-sensitive materials herein described encompass not only photosensitive materials for photographic use but all materials which undergo deterioration on exposure to light. Hence, they include not only various kinds of photosensitive materials for photographic use such as silver halide photosensitive materials for color and monochrome films, printing and X-ray, and diazo photosensitive materials, but foods such as chocolate, margarine, fermentation products such as Miso, wine, beer and the like, pharmaceutical articles and dyes which deteriorate when exposed to light.

The material of the present invention can be used for packaging all the aforementioned light-sensitive materials. In particular, it is very useful as a light-shielding paper for photographic roll film. The light-shielding paper used in the form of a backing sheet for the photographic roll film is used in such manners that it is wound upon a spool superposed on a given length of a photographic film or wound within a hollow drum, e.g., a magazine of a given size. Accordingly, the maximum thickness of the light-shielding paper is limited since the length of such paper is given. In general, it is fixed in a range of 50 to 150 microns, preferably in a range of 90 to 120 microns.

The main drawbacks in properties of the conventional materials for packaging photographic roll film are counted as follows: (1) Poor moisture proofness may cause adhesion of the light-shielding paper to film under high temperatures and humidities. (2) Fog may arise due to permeated gases. (3) Instability in dimensions may be caused by water absorption. The material of the present invention is excellent in light-shielding properties as well as in flexibility, moisture proofness, gas-shielding properties and stability in dimensions even when it is formed in a thin layer. From the viewpoint of moisture proofness, it is recommended that the substrate has, in addition to paper, an aluminum layer such as 3–30 microns thick aluminum foil, 5–100 microns thick aluminum paste, 0.01–0.2 microns thick aluminum deposited layer and 5–100 microns thick aluminum powder-dispersed layer. The surface layer (heat seal layer) or layers and the middle layer or layers of the present invention can easily be adhered to the surface (or surfaces) of such a substrate through melt co-extrusion coating.

EXAMPLES

The present invention will be described by way of embodiments with reference to drawings. However, the embodiments and examples are presented for better understanding of the invention but not for limitation thereof and any modifications apparent in the art would be made without departing from the concept and scope of the Claims of the present invention.

FIGS. 1 to 4 are sectional views showing conventional packaging material. FIGS. 5 to 15 are sectional views showing embodiments of the material according to the present invention.

FIG. 1 shows a packaging material comprising a substrate 1, a light-shielding layer 2 (such as an aluminum deposited layer, a purified layer or a light-shielding coating film layer), and a thermoplastic resin layer 3. This kind of material is widely used for packaging diazo photosensitive materials, low sensitive silver halide photosensitive materials, foods such as chocolate and Miso, dyes, medicines and the like.

Figure 2:
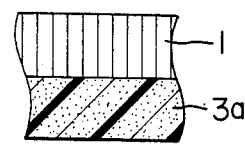

FIG. 2 shows a packaging material consisting of the substrate 1 and a thermoplastic layer 3a containing light-shielding material which is laminated directly onto the surface of the substrate 1.

Figure 3:
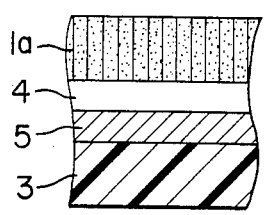

FIG. 3 shows a packaging material produced by adhering on aluminum foil 5 to a substrate 1a containing light-shielding material by means of an adhesive layer 4 and by coating the thermoplastic resin layer 3 to the aluminum layer.

Figure 4:
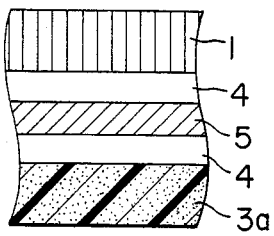

FIG. 4 shows an example structurally similar to that of FIG. 3 except that the thermoplastic resin layer 3a contains light-shielding material and the layer 3a is adhered to the aluminum foil 5 by means of an adhesive, for example by melt extrusion coating of LDPE. This material is good in moisture proofness, gas shielding properties and light-shielding properties and is most widely used for packaging silver halide photosensitive materials.

Figure 5:
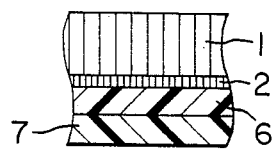
FIGS. 5 to 15 are seectional views showing examples of the packaging materials of the present invention.

FIG. 5 shows an embodiment of the present invention corresponding to the example in FIG. 1 of the conventional material. In lieu of the thermoplastic resin layer 3, a surface layer (a heat seal layer) 7 and a middle layer 6 are laminated through the melt co-extrusion process. This embodiment can eliminate such problems as neck-in and insufficient adhesion to the substrate, and have excellent heat seal properties, hot tack and sealability with concomitants.

Figure 6:
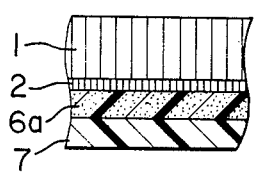

FIG. 6 shows an embodiment identical with the embodiment of FIG. 5 except that a middle layer 6a contains light-shielding material.

Figure 7:
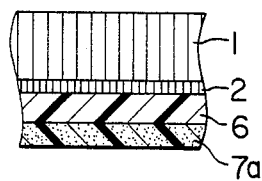

FIG. 7 shows an embodiment identical with the embodiment of FIG. 5 except that a surface layer (a heat seal layer) 7a contains light-shielding material which corresponds to the surface layer 7.

Figure 8:
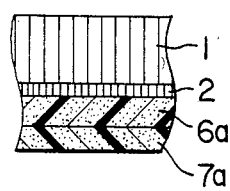

FIG. 8 shows an embodiment similar to the embodiment of FIG. 5 except that the middle layer 6a and the surface layer (the heat seal layer) 7a both contain light-shielding material. This embodiment has improved light-shielding properties.

Figure 9:
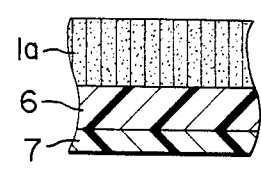
Figure 10:
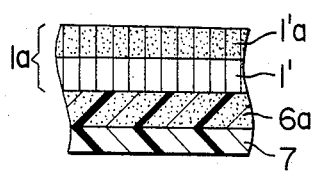
Figure 11:
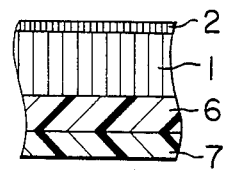
Figure 12:
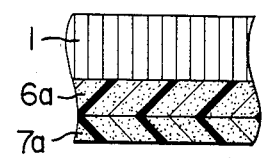

FIGS. 9 and 12 show embodiments corresponding to the example of FIG. 2. The middle layer 6 or 6a and the surface layer 7 or 7a are laminated to the substrate 1a or 1, respectively, through the melt co-extrusion coating process. The embodiments of FIG. 9 and FIG. 12 include at least one layer containing light-shielding material. FIG. 10 shows an embodiment in which the substrate 1a consists of two layers (1', 1'a). FIG. 11 shows an embodiment wherein the light-shielding layer 2 of FIG. 5 is laminated to the surface of the packaging material.

Figure 13:
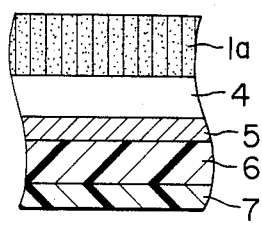
Figure 14:
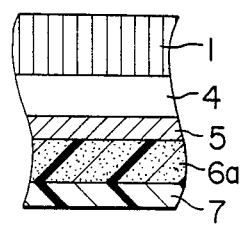
Figure 15:
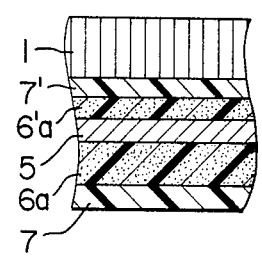

FIGS. 13 to 15 show embodiments corresponding to conventional examples of FIGS. 3 and 4. These embodiments are especially useful for packaging high photosensitive materials. Addition of light-sensitive material either to substrate as shown in FIG. 13 or to the middle layer as shown in FIG. 14 depends upon the material of each layer and the application of the packaging material. If middle layers (6a, 6'a) and surface layers (heat seal layers) (7, 7') are applied onto both surfaces of the aluminum foil 5 as shown in FIG. 15, no adhesive is necessary. The material of FIG. 15 is most suitable for applications where high Gelbo test strength and a great extent of impact perforation are especially required.

EXAMPLE 1

Tests were conducted to compare the properties of a light-shielding paper of the present invention having a structure as shown in FIG. 5 and a conventional paper as shown in FIG. 1.

Each substrate 1 was a bleached kraft paper having a basis weight of 30 g/cm² and a thickness of 30 microns, and including a 0.08 micron thick aluminum-deposited layer. The thermoplastic resin layer 3 of FIG. 1 was produced through melt extrusion coating of EEA containing 82% by weight of ethylene (NUC 6170 manufactured by Nippon Unicar Co., Ltd.) to form a layer of a thickness of 50 microns. Instead of the thermoplastic resin layer 3 of FIG. 1, a surface layer (heat seal layer) 7 of EEA having a thickness of 10 microns and containing 82% by weight of ethylene and a middle layer 6 of EEA having a thickness of 40 microns and containing 96.5% by weight of ethylene were used in FIG. 5.

The results in Table 1 show that the inventive light-shielding paper is more excellent in adhesion to the substrate, neck-in, cutting readiness, laminating speed, anti-blocking and manufacturing cost than the conventional light-shielding paper.

EXAMPLE 2

Similarly, tests were made to compare the properties of an inventive material for packaging light-sensitive materials as shown in FIG. 12 and a conventional material as shown in FIG. 2.

The conventional material of FIG. 2 had the thermoplastic resin layer 3a of EEA having a thickness of 20 microns and containing 82% by weight of ethylene and 4.5% by weight of carbon black, whereas the inventive material had a surface layer (heat seal layer) 7a of EEA having a thickness of 5 microns and containing 82% by weight of ethylene and 4.5% by weight of carbon black and the middle layer 6a of LDPE having a thickness of 15 microns and a density of 0.923 g/cm³ and containing 4.5% by weight of carbon black.

The results in Table 1 reveal that the inventive material is more excellent in adhesion to substrate, neck-in, cutting readiness, laminating speed, anti-blocking, manufacturing cost as well as carbon black dispersion than the conventional material.

EXAMPLE 3

In the similar manner, properties of an inventive material as shown in FIG. 13 and a conventional material as shown in FIG. 3 were compared.

The substrate 1a of each material was a bleached kraft paper having a thickness of 40 microns and a basis weight of 35 g/cm² and containing 5% by weight of carbon black, and an aluminum foil 5 having a thickness of 9 microns was laminated to the substrate by means of a melt extruded LDPE adhesive having a thickness of 13 microns. The conventional material had a thermoplastic resin layer 3 of L-LDPE (Ultzex 2080C manufactured by Mitsui Petrochemical Industries, Ltd.) having a thickness of 50 microns, while the inventive material had a surface layer (heat seal layer) 7 of L-LDPE (Ultzex 2080C manufactured by Mitsui Petrochemical Industries, Ltd.) having a thickness of 7 microns and a middle layer 6 of LDPE having a thickness of 43 microns and a density of 0.920 g/cm³, both layers having been melt co-extruded.

The results are shown in Table 1.

EXAMPLE 4

The packaging material of the present invention as shown in FIG. 15 and a conventional material as shown in FIG. 4 were compared. The conventional material was produced by laminating an LDPE layer containing 5% by weight of carbon black and having a thickness of 37 microns and a density of 0.923 g/cm³ onto an aluminum foil 5 by means of an adhesive 4. The substrate 1, the aluminum foil 5 and the adhesive 4 equivalent to those used for Example 3 were used. The material of FIG. 15 had the surface layers (heat seal layers) 7, 7' of EEA containing 88 wt % of ethylene and each having a thickness of 5 microns and the middle layers 6a', 6a of LDPE containing 5% by weight of carbon black and having a density of 0.923 g/cm³ and each layer having a thickness of 8 and 45 microns, respectively.

The heat seal layer 7' and the middle layer 6a' were beforehand melt co-extruded between the substrate 1 (in the narrow sense) and the aluminum foil 5 in the arrangement as shown in FIG. 15 to form a laminate (i.e., a substrate in the broad sense), then the middle layer 6a and the surface layer 7 were melt co-extruded to laminate onto the aluminum foil 5 of this laminate resulting in a composite sheet.

The results are shown in Table 1.

EXAMPLE 5

Tests were conducted to compare properties of the inventive and conventional packaging materials identical with those used in Example 2 except that instead of EEA, EVA containing 90% by weight of ethylene was used for the thermoplastic resin layer 3 and the surface layer 7a.

The results obtained were almost similar to those of Example 2.

EXAMPLE 6

Tests were conducted to compare properties of an inventive and conventional packaging materials identical with those used in Example 5 except that ionomer (Surlyn 1652 manufactured by E. I. Du Pont de Nemours & Co. (Inc.)), in lieu of EVA, was used for the thermoplastic resin layer 3 and the surface layer 7a.

The results were almost similar to those obtained in Example 5. The neck-in of the inventive material (FIG. 12) was 22 mm, much better than 35 mm for the conventional material. Besides the cost of resins for the inventive material was reduced to less than 60% of that for the conventional material.

TABLE 1

| | Example 1 | | Example 2 | | Example 3 | | Example 4 | | Example 5 | |
|---|---|---|---|---|---|---|---|---|---|---|
| | Drawing No. | | | | | | | | | |
| | FIG. 1 Conv. | FIG. 5 Inv. | FIG. 2 Conv. | FIG. 12 Inv. | FIG. 3 Conv. | FIG. 13 Inv. | FIG. 4 Conv. | FIG. 14 Inv. | FIG. 2 Conv. | FIG. 12 Inv. |
| | | | | | Neck-in | | | | | |
| | large 37 mm | small 25 mm | large 32 mm | small 22 mm | large 33 mm | small 20 mm | small 19 mm | small 20 mm | large 36 mm | small 23 mm |
| Light-shielding Properties | C | C | C | A | A | A | A | A | B | A |
| Sealability at Low Temperatures | A | A | A | A | B | B | D | A | A | A |
| Hot Tack | A | A | A | A | A | A | D | A | A | A |
| Cutting Readiness | D | B | D | B | D | B | B | B | D | B |
| Dipersion of Carbon Black | — | — | D | B | — | — | B | B | D | B |
| Laminating Speed | D | B | D | B | D | B | B | B | D | B |
| Anti-blocking(EEA) | E | C | E | C | C | B | B | C | E | C |
| Resin Material Cost | D | B | D | B | C | B | B | B | D | B |
| Ratio of Manufacturing Cost | 1.5 | 1.0 | 1.5 | 1.0 | 1.2 | 1.0 | 0.9 | 1.0 | 1.4 | 1.0 |
| Adhesion to Substrate | D | B | D | B | C | B | B | B | D | B |
| Heat Sealability with Polystyrene | A | A | A | A | E | E | E | B | A | A |

*Conv. = Conventional Material
**Inv. = Inventive Material
A = Excellent
B = Sufficiently practical
C = Practical
D = Hardly usable
E = Unusable (Improvements required)
Cutting readiness: Cutting readiness of a material upon being cut with a cutter, perforating machine, or the like.
Anti-blocking: difficulty of inter-layer adherence when load is applied to sheets.

I claim:

1. A material for packaging light-sensitive materials composed of a composite sheet comprising a substrate coated with at least a middle layer and at least a surface layer through melt co-extrusion, said surface layer being of thermoplastic resin which is heat sealable and yet has larger neck-in and which is selected from the group consisting of ethylene-vinyl acetate copolymer containing not more than 93 wt % ethylene, ethylene-acrylate copolymer containing not more than 93 wt % ethylene, ethylene-methacrylate copolymer containing not more than 93 wt % ethylene, linear low-density polyethylene, ionomer and mixtures thereof, said middle layer being of thermoplastic resin having small neck-in and good adhesion to the substrate and which is selected from the group consisting of low-density polyethylene, moderate-density polyethylene, high-density polyethylene, polypropylene, ethylene-acrylate copolymer containing not less than 95 wt % ethylene, ethylene-methacrylate copolymer containing not less than 95 wt % ethylene, ethylene-vinyl acetate copolymer containing not less than 95 wt % ethylene and mixtures thereof, and one or more layers of said composite sheet containing light-shielding material.

2. A material as defined in claim 1, wherein said ethylene-acrylate copolymer is ethylene-alkylacrylate copolymer.

3. A material as defined in claim 2, wherein said ethylene-alkylacrylate copolymer is ethylene-ethylacrylate copolymer, ethylene-methacrylate copolymer or a mixture thereof.

4. A material as defined in claim 1, wherein said substrate is a flexible sheet.

5. A material as defined in claim 1, wherein said surface layer is thinner than said middle layer.

6. A material as defined in claim 1, wherein said surface layer and said middle layer in total are about 7 to about 100 microns thick.

7. A material as defined in claim 6, wherein said surface layer approximately ranges from 1 to 30 mirons.

8. A material as defined in claim 5, wherein the thickness ratio of said surface layer to said middle layer approximately ranges from 1:1.2 to 1:25.

9. A material as defined in claim 1, wherein the light-shielding material is contained in a powdery form dispersed in said composite sheet, a layer form, or a combination form thereof.

10. A material as defined in claim 9, wherein the light-shielding material comprises aluminum foil or aluminum deposited layer.

11. A material as defined in claim 9, wherein said light-shielding material comprises carbon black.

12. A material as defined in claim 9, wherein said substrate comprises the light-shielding material of the layer form onto which said middle layer and surface layer are melt co-extruded and laminated.

13. A material as defined in claim 1, wherein said ethylene-vinyl acetate copolymer ethylene-acrylate copolymer ethylene-acrylate alkyl ester copolymer and ethylene-methacrylate copolymer of said surface layer comprise 75–90 wt % ethylene.

14. A material as defined in claim 1, wherein said middle layer and surface layer are formed either on one side or both sides of the substrate.

* * * * *